(12) United States Patent
van der Lely et al.

(10) Patent No.: US 6,443,093 B1
(45) Date of Patent: Sep. 3, 2002

(54) METHOD AND APPARATUS FOR AUTOMATICALLY FEEDING ANIMALS

(75) Inventors: Olaf van der Lely, Zug (CH); Alexander van der Lely, Rotterdam; Karel van den Berg, Bleskensgraaf, both of (NL)

(73) Assignee: Maasland, N.V., Maasland (NL)

( * ) Notice: Subject to any disclaimer, the term of this patent is extended or adjusted under 35 U.S.C. 154(b) by 0 days.

(21) Appl. No.: 09/592,263

(22) Filed: Aug. 16, 2000

Related U.S. Application Data

(63) Continuation of application No. PCT/NL99/00612, filed on Oct. 1, 1999.

(30) Foreign Application Priority Data

Oct. 13, 1998 (NL) .............................................. 1010305

(51) Int. Cl.[7] .............................. H01J 3/00; H01J 5/00
(52) U.S. Cl. .................................. 119/14.01; 119/14.02
(58) Field of Search ........................... 119/14.01, 14.02, 119/51.01, 51.02, 14.09, 14.14, 14.15; 604/74

(56) References Cited

U.S. PATENT DOCUMENTS

| | | | | |
|---|---|---|---|---|
| 420,195 A | * | 1/1890 | Graves et al. .............. | 128/281 |
| 4,323,067 A | * | 4/1982 | Adams ....................... | 128/281 |
| 5,074,248 A | | 12/1991 | Loader ........................ | 119/20 |
| 5,355,833 A | | 10/1994 | Legrain ................... | 119/51.02 |
| 5,778,820 A | * | 7/1998 | van der Lely et al. ..... | 119/14.18 |
| 6,263,832 B1 | * | 7/2001 | van den Berg .......... | 119/14.08 |

FOREIGN PATENT DOCUMENTS

EP 0 680673 B1 12/1997

* cited by examiner

*Primary Examiner*—Charles T. Jordan
*Assistant Examiner*—Judith A. Nelson
(74) *Attorney, Agent, or Firm*—Penrose Lucas Albright

(57) ABSTRACT

A method and apparatus for automatically feeding calves and other animals a substance comprising milk, mother's milk, foremilk, beestings, beestingslike milk, or colostrums or a combination thereof by conveying same from a first animal to a second animal via an automatic milking machine and a transport system. The transport system includes an analyzing device to determine the composition of the substance received from the first animal and a metering device for feeding the substance to the second animal. The transport system also has two storage areas for receiving samples of the substance and storing same in a cool, frozen or dried frozen state. A mixing mechanism is also provided for adding material such as water, medicants, vitamins, nutritive supplements, immunological stimulants, growth stimulants, hormones, and combinations thereof to the substance consumed by the second animal for the nutritive needs of the second animal. The second animal's physical condition and state of health are monitored by sensors.

76 Claims, 1 Drawing Sheet

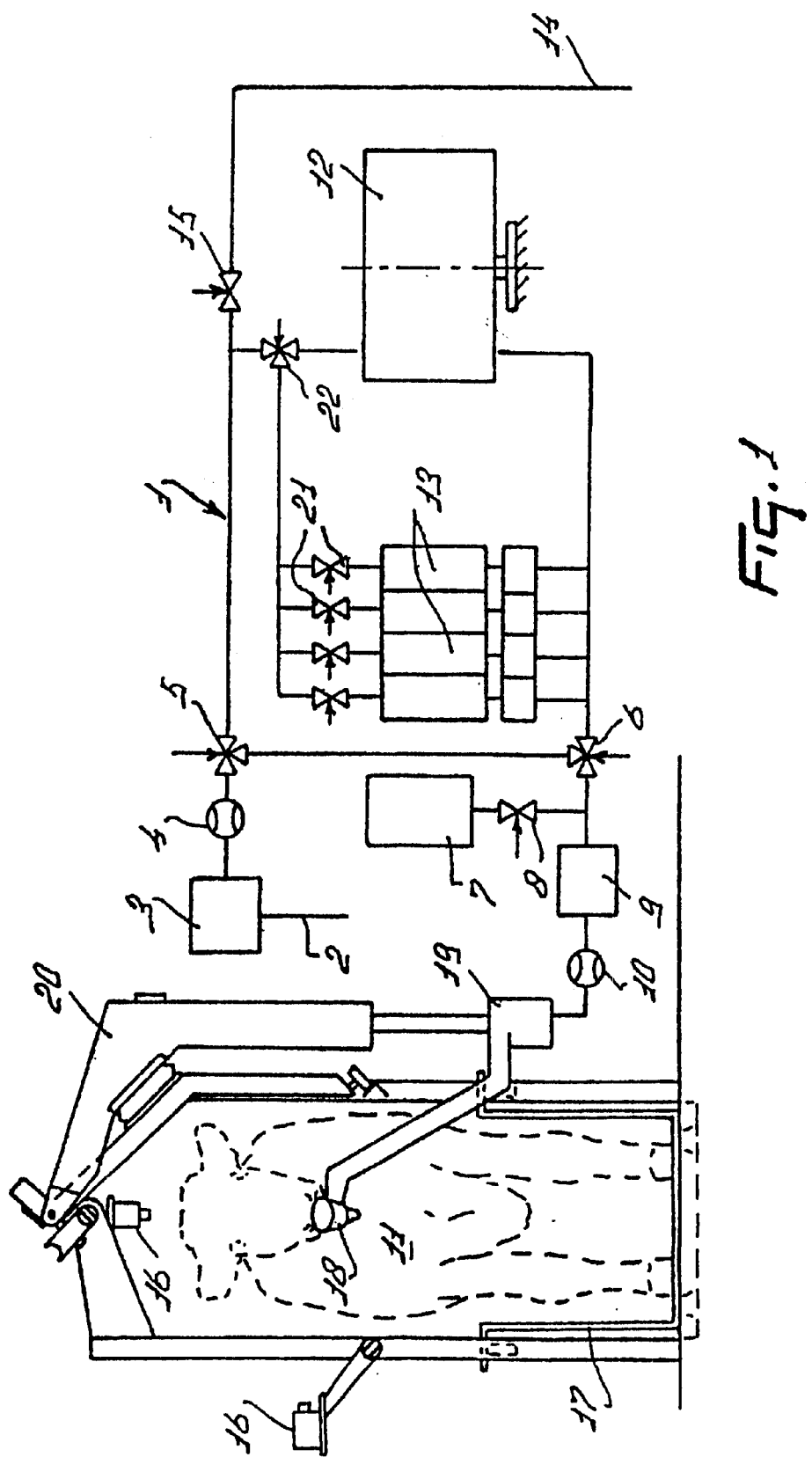

METHOD AND APPARATUS FOR AUTOMATICALLY FEEDING ANIMALS

RELATED APPLICATION

This Application is a Continuation of International Application No. PCT/NL99/00612 filed Oct. 1, 1999

FIELD OF THE INVENTION

The invention relates to a method of automatically feeding animals, such as calves and cows, in which milk or mother's milk, such as beestings, beestinglike milk, foremilk, or colostrum, is a component part of the feed, and in which the amount of feed corresponding to the nutritive needs of the individual animal and the feed is supplied to the individual animal.

BACKGROUND OF THE INVENTION

The prior art method has the disadvantage that the milk or mother's milk is obtained manually from the mother of the cow or dairy animal and is subsequently supplied to the feeding machine for young animals. This is very labor-intensive, especially because the young animals often have to be provided with milk or mother's milk many times a day. It may also be advantageous to compose a special feed for certain animals, such as bulls that are used for artificial insemination (AI-bulls). Also in that case feeding is very labor-intensive.

SUMMARY OF THE INVENTION

The invention aims to obviate these drawbacks. For that purpose the milk or mother's milk is obtained by a milking machine and is supplied automatically and directly from the milking machine to the individual animal, or alternatively the milk or mother's milk is supplied automatically after having been stored in a first or further storage means. In this manner it is no longer necessary to obtain the milk or mother's milk manually and the milk is supplied automatically to the individual animal, such as a calf or an AI-bull.

According to another inventive feature, an individual animal is identified and the individual animal is provided with feed, provided that a predetermined time has elapsed since the last feeding of this individual animal.

In accordance with an inventive feature, the composition of the feed is automatically conformed to the current nutritive requirements of the individual animal. In this connection the composition of the feed is automatically correlated with the current nutritive requirements of the individual animal by adding one or more supplementary substances. The supplementary substances that can be automatically added to the composition of the feed comprise inter alia water, vitamins, medicaments, nutritive supplements, immunological stimulants, or growth stimulants, such as hormones.

According to a further inventive feature, an automatic determination is made of the composition of the milk or mother's milk and, on the basis of said determination, the milk or mother's milk obtained by the milking machine is automatically discharged or stored in a first or further storage means.

In accordance with another aspect of the invention, the milk or mother's milk obtained by the milking machine is cooled and stored in a liquid or solid phase in a first or further storage means. During storage of the milk or mother's milk, the characteristics and the composition of the milk or mother's milk are maintained as optimal as possible, while the milk or mother's milk is preserved at the same time.

According to again another aspect of the invention, one or more characteristics, such as an identification number, of the dairy animal, such as a cow or mother cow from which the milk or mother's milk has been yielded, are stored in a memory, and the milk or mother's milk from the dairy animal is supplied to the corresponding individual animal, such as a calf. In this manner, it is possible for the individual animal to receive milk or mother's milk from its mother.

In accordance with an inventive feature, the current nutritive requirements of the individual animal are determined with the aid of automatic means and the composition of the feed is correlated with the current nutritive requirements of the individual animal. In this manner, it is possible to provide the individual animal with special feed, for example when the animal is ill. According to a further inventive feature, the automatic means is adapted to determine the current nutritive requirements of the individual animal by optical or acoustic means or both, or on the basis of the animal's weight, or one or more dimensions of the individual animal or on the basis of a combination of these. The data relating to the determination of the current nutritive requirements, nutritive needs, the composition of the milk or mother's milk and the composition of the feed are stored in a memory. Suitable milk or mother's milk which is maintained in storage means is selected for use on the basis of the data stored in a memory. Thus the individual animal is provided with milk or mother's milk which has been stored or supplied directly and which has a composition which corresponds to the current nutritive requirements of the individual animal.

The invention also relates to an apparatus for applying the above-mentioned methods, characterized that the apparatus comprises a transport system for liquids, a metering device, and a feeding station for animals which is coupled to a milking machine. The transport system is adapted to supply the milk or mother's milk from the milking machine directly to a metering device, or the transport system is adapted to supply the milk or mother's milk to a metering device after the milk or mother's milk has been held in a storage means.

In accordance with another aspect of the invention, the apparatus comprises automatic means for determining the current nutritive requirements and nutritive needs of the individual animal, which automatic means is adapted to measure the condition. or growth or weight, or blood pressure or any desired combination thereof of the individual animal. The composition of the feed is based on the current nutritive requirements of the individual animal, which composition consists of milk and complementary substances or mother's milk and supplementary substances and which composition corresponds to a previously adjusted composition of the feed, such previously adjusted composition being stored in a memory. According to another characteristic of the invention, an algorithm calculates the previously adjusted composition of the feed for the individual animal on the basis of data stored in memory, which data comprise values relating to the condition, growth and weight of the individual animal. A memory stores the values relating to the determination or calculation of the current nutritive requirements or needs or the composition of the milk or mother's milk or the composition of the feed or any selected combination thereof.

According to a further inventive feature, the means adapted to measure the condition of the individual animal comprises a picture processing device or a color sensor or an air sampling device or a sphygmomanometer or a temperature sensor or any combination thereof. Such an air sampling device is known from European Patent Application EP 0 670

673 B1 of Mottram et al, published Sep. 13, 1995, disclosing a device that collects air samples in the vicinity of an animal, analyzes same and establishes with the aid thereof the animal's condition. The means adapted to measure the growth of the individual animal comprises acoustic or optical sensors, or a picture processing device. The means adapted to measure the weight of the individual animal comprises a pair of scales, strain gages or piezo elements. The strain gages or piezo elements may be fitted in the floor, so that the flow of the feeding station can be cleaned easily.

In accordance with again another aspect of the invention, the metering device is provided with a feeding trough or a drinking spout, such as a flexible nipple, or both. According to another aspect of the invention, the metering device is provided with a temperature sensor. In a preferred embodiment of the invention, the metering device consists of a rubber nipple provided with a temperature sensor, so that the physical condition of the individual animal can be ascertained.

According to another inventive feature, the apparatus is provided with an automatic mixing device adapted to add supplementary substances to the milk of mother's milk, which supplementary substances are correlated with the current nutritive requirements of the individual animal. For that purpose the automatic mixing device is provided with storage means for storing supplementary substances such as water, medicaments, vitamins, nutritive supplements, immunological stimulants, or growth stimulants, such as hormones.

In accordance with a further inventive feature, the transport system comprises computer controlled valves. According to again another inventive feature, the apparatus is provided with a first and a second volume flowmeter. The first volume flowmeter is suitable for measuring the amount of milk or mother's milk which flows through the meter. This milk or mother's milk is obtained by the milking machine. The second volume flowmeter is suitable for measuring the amount of feed supplied by the transport system to the metering device.

According to another aspect of the invention, the apparatus comprises an automatic analysis device adapted to perform measurements on the milk or mother's milk. The automatic analysis device is adapted to measure whether the milk or mother's milk is suitable for being consumed by an animal. The automatic analysis device is also adapted to measure the composition of the milk or mother's milk. According to another aspect of the invention, the automatic analysis device is adapted to store in a memory the amount or composition or both, of the milk or mother's milk and one or more other characteristics of the dairy animal from which the milk or mother's milk has been obtained. The automatic analysis device is also adapted to measure color, cell count, hormones, germ count, nutritional value, contamination and concentration of antibiotics in the milk or mother's milk which is analyzed. The automatic analysis device is also adapted to apply DNA-analysis techniques, such as PCR and NASBA, to the milk or mother's milk which it analyses. According to another inventive feature, the automatic analysis device is adapted to remove the milk or mother's milk or to transmit same to storage means for supplying the milk or mother's milk to the animal at a later point of time.

In accordance with again another inventive feature, a first storage means is provided with one or more reservoirs. According to another inventive feature, the first storage means is provided with coolers. The first storage means can also be provided with a temperature regulator. A memory is adapted to store the location of the milk or mother's milk in the first storage means, together with one or more particulars, such as an identification number of the individual from which the milk or mother's milk has been taken, and the composition or the amount of the milk or mother's milk or both in the first storage means. According to another inventive feature, the first storage means is adapted to store the milk or mother's milk in a liquid phase. According to again another aspect of the invention, one or more reservoirs are designed as refrigerated tanks. One or more reservoirs can also be designed as carousel or as sample racks or both. In this form the milk or mother's milk can easily be stored in separate reservoirs and be recollected.

According to an additional inventive feature, a further storage means is provided with one or more reservoirs. The further storage may be provided with coolers. According to another feature, the further storage means is provided with a temperature regulator. According to again another feature, a memory is adapted to store the location of the milk or mother's milk in the further storage means, together with one or more characteristics of the dairy animal from which the milk or mother's milk has been obtained, and the composition or the amount or both of the stored milk or mother's milk. According to yet another inventive feature, the further storage means is adapted to store the milk or mother's milk in a solid phase. According to still another inventive feature, one or more reservoirs are designed as freezing chambers or freeze-dry chambers. One or more reservoirs of the further storage means any also be designed as carousel or as sample racks or both.

In accordance with a further inventive feature, the apparatus comprises one or more temperature regulating means adapted to warm the feed automatically, so that the feed is adapted to be consumed by the individual animal. According to the last inventive feature, the apparatus comprises means adapted to sterilize or to pasteurize or do both to the feed automatically.

BRIEF DESCRIPTION OF THE DRAWING

The invention will now be explained in further detail with reference to the drawing of an exemplary embodiment of an apparatus according to the invention.

FIG. 1 is a schematic view of an apparatus according to the invention.

DETAILED DESCRIPTION OF THE PREFERRED EMBODIMENTS

The embodiment of FIG. 1 shows an apparatus which embodies the invention. The apparatus is provided with a transport system 1 consisting, in a preferred embodiment, of a conduit line system for the transport of milk or mother's milk, auxiliary substances and feed. The transport system is provided with automatic valves 8, 15, and 21 and automatic three-way valves 5, 6 and 22. From an inlet 2 the milk or mother's milk enters the apparatus from the milking machine which may consist of one or more milking robots. The milk or mother's milk is analyzed by an automatic analysis device 3 measuring the composition of the milk or mother's milk. The results of the measurement of the composition together with the identification code of the mother cow are stored in memory. A first volume flowmeter 4 measures the amount of milk or mother's milk which flows therethrough. The result is also stored in a memory together with the data from the automatic analysis device. Subsequently the milk or mother's milk can be supplied, via threeway valve 5, automatically and directly to an individual animal 11, or to be stored in a first storage means 12 or to a further storage means 13, or be discharged from the apparatus via a valve 15 and a discharge channel 14, to, for example, a sewer.

The storage of milk or mother's milk takes place in a first storage means 12 or further storage means 13. In first storage means 12 the milk or mother's milk is stored automatically, preferably in a cooled liquid phase. First storage means 12 is provided with separate reservoirs, so that the milk from different mother animals or dairy animals can be retained in separate reservoirs in the same storage means 12. In a memory are stored the compositions of the milk or mother's milk, an identification code of the mother animal from which the milk or mother's milk has been obtained and the locations for each animal's milk or mother's milk in first storage means 12. In the preferred embodiment of the invention, first storage means 12 is designed as a sample rack or a carousel, so that in a relatively small space many milk samples can be separately and easily be stored in first storage means 12 and be collected therefrom. In further storage means 13 the milk or mother's milk is stored automatically, preferably in a refrigerated solid phase. The milk or mother's milk can be frozen, but by doing so, the composition of the milk or mother's milk may be changed. Therefore, in a preferred embodiment of the invention, further storage means 13 consists of a freeze-dry chamber in which the milk or mother's milk is stored automatically, its composition remaining unchanged. Also in this case further storage means 13 is provided with separate reservoirs, so that milk from different animals can be held in the same storage means 13. The milk or mother's milk compositions are stored in a computer memory together with an identification code of the relevant mother animal from which the milk or mother's milk has been obtained and the location of the milk or mother's milk in further storage means 13. In the preferred embodiment of the invention, further storage means 13 is also designed as a sample rack or a carousel, so that in a relatively small space many milk samples can be held separately whereby the samples can easily be stored in further storage means 13 and be collected therefrom.

Via automatic three-way valve 6, the milk or mother's milk received directly from the milking machine or from a storage means 12 or further storage means 13, having been stored therein, is then supplied to animal 11. Such milk is warmed by a heating element 9 to make it suitable for consumption by young animal 11. The amount of feed supplied to young animal 11 is measured by means of a second volume flowmeter 10.

When an animal enters the feeding station, it is identified automatically. The composition of the feed is adapted to the current nutritive needs of such animal. With the aid of automatic mixing device 7 and valve 8, supplementary substances can be added to the milk or mother's milk, so that the feed is composed for the relevant individual animal 11. The current nutritive needs are determined by means of sensors, an algorithm and data relating to the condition, growth and weight of the individual animal, which data are stored in a memory. These sensors comprise in this embodiment: optical sensors 16 for measuring the condition and growth of the animal, a weighing device 17 and a temperature sensor which is provided in a feed metering device 18.

The individual animal 11 is then fed by means of metering device 18 which, in this embodiment, is connected to a movable arm 19. Said movable arm may be connected to a pivotable arm 20.

Although we have disclosed the preferred embodiments of our invention, it is to be understood that it is capable of other adaptations and modifications within the scope of the following claims.

What is claimed is:

1. A method of feeding a substance which consists essentially of milk, mother's milk, beestings, beestinglike milk, foremilk or colostrums or any combination thereof that is provided by a first animal to a second animal, the method comprising automatically milking said first animal with a milking machine to obtain said substance and supplying said substance directly from said milking machine to be consumed by said second animal, identifying means identifying said second animal and determining said second animal's nutritive needs, and limiting the amount of said substance supplied to said second animal based on said second animal's nutritive needs.

2. A method in accordance with claim 1 wherein said second animal is not again provided with said substance until a predetermined duration of time has elapsed since the last time said second animal was provided with said substance.

3. A method in accordance with claim 1 comprising adding material to said substance before it is consumed by said second animal, said material consisting of water or vitamins or medicaments or nutritive supplements or immunological stimulants or growth stimulants or hormones or any combination thereof.

4. A method in accordance with claim 3 wherein said added material or combination of added materials conform to the nutritive needs determined for the said second animal.

5. A method in accordance with claim 4 wherein the amount of said material or combination of said materials is automatically added to said substances before it is consumed by said second animal.

6. A method in accordance with claim 1 wherein said substance is analyzed before it is consumed by said second animal.

7. A method of selectively feeding a substance which consists essentially of milk or mother's milk or beestings or beestinglike milk or foremilk or colostrums or any combination thereof which is provided by a first animal to be selectively consumed by a second animal, the method including the step of automatically milking said first animal to provide said substance and analyzing the substance so provided by analyzing means to determine whether or not it is sufficiently wholesome for consumption by said second animal, diverting said substance when it is determined to be insufficiently wholesome for consumption by said second animal so that it will not be consumed by said second animal and transmitting said substance that is determined to be sufficiently wholesome for consumption by said second animal to said second animal within a continuous conduit system for consumption by said second animal.

8. A method in accordance with claim 7 comprising the further step of storing said substance which has been determined to be sufficiently wholesome for consumption by said second animal in storage means included in said continuous conduit system.

9. A method in accordance with claim 8 comprising the step of cooling said substance which is stored in said storage means in said continuous conduit system.

10. A method in accordance with claim 9 wherein said substance which is cooled in said continuous conduit system is cooled and stored in said storage means in a solid phase condition.

11. A method in accordance with claim 7 wherein said first animal is assigned an unique identifier, said identifier being stored in a computer memory.

12. A method in accordance with claim 7 wherein said second animal is assigned an unique identifier, said identifier being stored in a computer memory.

13. A method in accordance with claim 12 comprising automatically determining the nutritive requirements of said second animal.

14. A method in accordance with claim 13 which comprises adding materials to said substance that is determined to be sufficiently wholesome for consumption by said second animal based on said automatically determined nutritive requirements of said second animal.

15. A method in accordance with claim 14 wherein said material added to said substance which has been determined to be sufficiently wholesome for consumption by said second animal consists essentially of water or vitamins or medicaments, or nutritive supplements or immunological stimulants, or growth stimulants or hormones or any combination thereof.

16. A method in accordance with claim 13 wherein the automatic determination of the nutritive requirements of said second animal are made by optical means.

17. A method in accordance with claim 13 wherein the automatic determination of the nutritive requirements of said second animal are made by acoustic means.

18. A method in accordance with claim 13 wherein said automatic determination of the nutritive requirements for said second animal are made by weighing said second animal.

19. A method in accordance with claim 13 wherein said automatic determination of the nutritive requirements of said second animal are made by measuring the dimensions of said second animal.

20. A method in accordance with claim 13 which comprises providing said second animal with identifying symbols, storing said identifying symbols for said second animal in a memory, and analyzing the composition of said substance and storing said analysis in said memory.

21. A method in accordance with claim 20 wherein the determination of whether or not said substance is sufficiently wholesome for consumption by said second animal is based on said data stored in said memory.

22. An apparatus for delivering a substance consisting essentially of milk, mother's milk, foremilk, beestings, beestinglike milk or colostrums or any combination thereof from a first animal to a second animal which comprises an automatic milking machine for obtaining said substance from said first animal, a transport system for receiving said substance from said milking machine, an analysis device in said transport system for determining the composition of said substance received from said first animal, and a feed metering means for receiving said substance and feeding said substance to said second animal.

23. An apparatus in accordance with claim 22 wherein said transport system includes a storage means and valve means for selectively routing said substance to said storage means for subsequent delivery to said metering means.

24. An apparatus in accordance with claim 22 which comprises automatic means for determining the nutritive requirements of said second animal.

25. An apparatus in accordance with claim 4 wherein said automatic means ascertains the physical state of said second animal.

26. An apparatus in accordance with claim 5 wherein said automatic means ascertains the growth of said second animal.

27. An apparatus in accordance with claim 25 wherein said automatic means ascertains the weight of said second animal.

28. An apparatus in accordance with claim 25 wherein said automatic means ascertains the blood pressure of said second animal.

29. An apparatus in accordance with claim 22 which comprises data of the current nutritive requirements of said second animal and adjustment means for adjusting the composition of said substance in view of said information data to meet the current nutritive requirements of said second animal.

30. An apparatus in accordance with claim 22 which comprises an algorithm and data stored in a memory of the physical state, including the growth and weight of said second animal, and adjustment means for adjusting the composition of said substance, said algorithm providing control of said adjustment means based on said information data.

31. An apparatus in accordance with claim 22 which comprises information data in a computer memory which consists essentially of data that provide said second animal's nutritive requirements or the composition of said substance or any combination thereof.

32. An apparatus in accordance with claim 22 which comprises an imaging device for providing an image of said second animal.

33. An apparatus in accordance with claim 22 wherein said analyzing device consists of a color sensor or an air sampling device or a sphygmomameter or a temperature sensor or any combination thereof.

34. An apparatus in accordance with claim 22 comprising growth measuring means adapted to measure the growth of said second animal which consists of an acoustic sensor or an optical sensor or an imaging device or any combination thereof.

35. An apparatus in accordance with claim 22 which comprises weighing means to determine the weight of said second animal, said weighing means consisting of a pair of scales, or spring gauges, or piezo elements or any combination thereof.

36. An apparatus in accordance with claim 22 wherein said metering means comprises a feeding trough.

37. An apparatus in accordance with claim 22 wherein said metering means comprises a drinking spout.

38. An apparatus in accordance with claim 37 wherein said drinking spout comprises a flexible nipple.

39. An apparatus in accordance with claim 22 wherein said metering means comprises a temperature sensor.

40. An apparatus in accordance with claim 22 comprising automatic mixing means for adding additional materials to said substance.

41. An apparatus in accordance with claim 40 wherein said additional materials are related to the current nutritive requirements of said second animal.

42. An apparatus in accordance with claim 41 wherein the composition of said additional materials is based on the nutritive needs of said second animal and the composition of said substance as determined by said analyzing device.

43. An apparatus in accordance with claim 40 wherein said automatic mixing means is provided with storage means for storing materials consisting essentially of water or medicaments, or vitamins or nutritive supplements or immunological stimulants or growth stimulants, including hormones or any combination thereof.

44. An apparatus in accordance with claim 22 wherein said transport system comprises computer controlled valves.

45. An apparatus in accordance with claim 22 comprising a first volume flowmeter.

46. An apparatus in accordance with claim 45 which comprises a second volume flowmeter.

47. An apparatus in accordance with claim 45 wherein said first volume flowmeter measures the amount of said substance provided by said first animal.

48. An apparatus in accordance with claim 44 wherein said second volume flowmeter measures the amount of said substance supplied by said transport system to said metering means.

49. An apparatus in accordance with claim 22 wherein said analyzing device determines whether or not said substance is suitable for being supplied to said second animal.

50. An apparatus in accordance with claim 22 wherein said measuring device measures the amount of said substance provided by said first animal.

51. An apparatus in accordance with claim 22 wherein said analyzing device measures characteristics of said substance consisting essentially of color, or cell count or hormones therein, or germ count, or nutritional value, or contamination or the concentration of antibiotics, or any combination thereof.

52. An apparatus in accordance with claim 22 wherein said analyzing device applies DNA-analysis techniques to said substance.

53. An apparatus in accordance with claim 52 wherein said DNA-analysis techniques comprise PCR techniques.

54. An apparatus in accordance with claim 52 wherein said DNA-analysis techniques comprise NASBA techniques.

55. An apparatus in accordance with claim 22 wherein said analyzing device comprises storage means from which said substance is available for analysis.

56. An apparatus in accordance with claim 22 which comprises storage means that includes at least one reservoir.

57. An apparatus in accordance with claim 56 wherein said storage means comprises coolers.

58. An apparatus in accordance with claim 22 which comprises storage means for said substance, said storage means including a temperature regulator.

59. An apparatus in accordance with claim 22 which comprises storage means in which said substance is stored and an information memory data which consist of identifying signals that identify said first animal, the composition of said substance in said storage means or the amount of said substance in said storage means or any combination thereof.

60. An apparatus in accordance with claim 59 which comprises storage means that stores said substance in a liquid phase.

61. An apparatus in accordance with claim 22 which comprises refrigerated tanks.

62. An apparatus in accordance with claim 22 which comprises carousels for receiving said substance.

63. An apparatus in accordance with claim 22 which comprises sample racks for receiving said substance.

64. An apparatus in accordance with claim 22 which comprises at least one reservoir for receiving said substance.

65. An apparatus in accordance with claim 22 which comprises first storage means and second storage means, said second storage means including coolers.

66. An apparatus in accordance with claim 65 wherein said second storage means comprises a temperature regulator.

67. An apparatus in accordance with claim 22 which comprises first storage means and second means for receiving said substance and information memory which stores data which identifies said first animal that provided substance in said second storage means.

68. An apparatus in accordance with claim 67 wherein said information memory further stores data which consists of the composition of said substance in said second storage means that was provided by said first animal or the amount of said substance in said storage means provided by said first animal or data relating to both the composition and the amount of said substance in said storage means provided by said first animal.

69. An apparatus in accordance with claim 22 which comprises first storage means and second storage means for said substance, said second storage means storing said substance in a solid phase.

70. An apparatus in accordance with claim 22 which comprises a freezing chamber for receiving and freezing said substance.

71. An apparatus in accordance with claim 22 which comprises a dry-freeze chamber for dry-freezing said substances.

72. An apparatus in accordance with claim 22 which comprises a first storage means and a second storage means for receiving said substance, said second storage means comprising a carousel.

73. An apparatus in accordance with claim 22 which comprises a first storage means and a second storage means for receiving said substance, said second storage means comprising a sample rack.

74. An apparatus in accordance with claim 22 which comprises a thermal means including temperature regulating means for warming said substance automatically before it is consumed by said second animal.

75. An apparatus in accordance with claim 22 which comprises sterilizing means for sterilizing said substance before it is consumed by said second animal.

76. An apparatus in accordance with claim 22 which comprises pasteurized means for pasteurizing said substances before it is consumed by said second animal.

* * * * *